US009424135B1

(12) United States Patent
Carpenter et al.

(10) Patent No.: US 9,424,135 B1
(45) Date of Patent: Aug. 23, 2016

(54) MIGRATION OF LARGE DATA FROM ON-LINE CONTENT MANAGEMENT TO ARCHIVAL CONTENT MANAGEMENT

(71) Applicant: International Business Machines Corporation, Armonk, NY (US)

(72) Inventors: William J. Carpenter, Bothell, WA (US); David G. Skinner, Bellevue, WA (US); Hailin Wang, Beijing (CN); Michael G. Winter, Camarillo, CA (US); Jun Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/984,660

(22) Filed: Dec. 30, 2015

(51) Int. Cl.
*G06F 11/00* (2006.01)
*G06F 11/14* (2006.01)
*H04L 29/12* (2006.01)

(52) U.S. Cl.
CPC ............. *G06F 11/1435* (2013.01); *H04L 61/35* (2013.01)

(58) Field of Classification Search
CPC .................... Y10S 707/99931; G06F 11/1435; G06F 3/0644; H04L 29/12009; H04L 29/12783; H04L 61/35; H04L 67/1097; H04L 67/28; H04L 67/2823; H04L 67/327
See application file for complete search history.

(56) References Cited

U.S. PATENT DOCUMENTS

| 5,701,482 | A * | 12/1997 | Harrison | G06F 9/5088 712/21 |
| 6,449,607 | B1 * | 9/2002 | Tomita | G06F 17/30315 707/823 |
| 6,918,009 | B1 * | 7/2005 | Sato | G06F 12/0815 711/137 |
| 7,277,892 | B2 * | 10/2007 | Yanase | B82Y 10/00 |
| 7,600,080 | B1 * | 10/2009 | Bhattacharyya | G06F 12/0817 711/118 |
| 2006/0101130 | A1 * | 5/2006 | Adams | H04L 29/12009 709/218 |
| 2008/0086610 | A1 * | 4/2008 | Ejiri | G06F 11/2094 711/162 |
| 2009/0182739 | A1 | 7/2009 | Crockett et al. | |
| 2010/0281027 | A1 | 11/2010 | Duan et al. | |
| 2012/0254174 | A1 | 10/2012 | Mitra et al. | |
| 2013/0007046 | A1 * | 1/2013 | Baum | G06F 13/4022 707/769 |
| 2013/0295996 | A1 * | 11/2013 | Yeh | G06F 12/0246 455/558 |
| 2014/0372658 | A1 * | 12/2014 | Safranek | G06F 13/14 710/314 |
| 2015/0127907 | A1 * | 5/2015 | Fahim | G06F 12/0813 711/120 |
| 2015/0254257 | A1 | 9/2015 | Kritchko et al. | |

FOREIGN PATENT DOCUMENTS

WO 2006021944 A 3/2006

* cited by examiner

*Primary Examiner* — Mardochee Chery
(74) *Attorney, Agent, or Firm* — Sherman IP LLP; Kenneth L. Sherman; Steven Laut (57) ABSTRACT

A method for content management in a file system includes creating a file system storage device with a storage area symbolic name. A core table data structure is generated including a core table partition field. An ancillary table data structure is generated including an ancillary table partition field. Partitioning rules for the file system storage device are cached based on the storage area symbolic name. Property values for a document are compared with the cached partitioning rules to determine a match for the storage area symbolic name. The document is stored into a partition of the file system storage device based on the storage area symbolic name. Metadata for the document is stored into a partition of the core table based on the core table partition field. Ancillary objects for the document are stored into a partition of the ancillary table based on the ancillary partition fields.

1 Claim, 6 Drawing Sheets

FIG. 6

MIGRATION OF LARGE DATA FROM ON-LINE CONTENT MANAGEMENT TO ARCHIVAL CONTENT MANAGEMENT

BACKGROUND

Some content manager systems offer scheduled capability for migration tasks, meaning that the migration tasks can only perform data movement during that period. The common experience with systems with this limited migration schedule is that migration tasks usually cannot be fully completed, and the pipeline of migration tasks becomes longer and longer. More powerful hardware is involved to resolve this issue.

SUMMARY

Embodiments of the invention relate to migration of large data from an on-line content management system to an archival management system. One embodiment includes a method for content management in a file system including creating a file system storage device with a storage area symbolic name. A core table data structure is generated including a core table partition field including a core table partition key having the storage area symbolic name as a value. An ancillary table data structure is generated including an ancillary table partition field including an ancillary table partition key having the storage area symbolic name as a value. Partitioning rules for the file system storage device are cached based on the storage area symbolic name. A document is created in the file system. Property values for the document are compared with the cached partitioning rules to determine a match for the storage area symbolic name. The storage device symbolic name for the document is dynamically selected based on a match. The document is stored into a partition of the file system storage device based on the storage area symbolic name. Metadata for the document is stored into a partition of the core table based on the core table partition field. Ancillary objects for the document are stored into a partition of the ancillary table based on the ancillary partition fields. Table partition migration is based on the partition of the core table and the partition of the ancillary table, and content partition migration is based on the partition of the file system storage device.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In order to improve the performance and reduce the workload on an on-line system, efficient data migration from an on-line content management/manager system to an archival system is important. If a certain amount of old data, which is not accessed frequently, can be quickly moved to an archival system and a certain fixed number of recent data is left on the on-line system, this will extremely improve the performance on an on-line system. This requires an efficient method to move data between on-line and archival systems, especially, the data migration should not impact the on-line creation, query, update and deletion operations running in the on-line system. The asynchronous migration mechanism which is used by conventional content manager systems is not an efficient solution. In the asynchronous migration mechanism, migration tasks are created in an on-line system and each migration task runs to move one item, including its properties and content, to an archival system. This is not an efficient method, especially when a system has heavy workload to process on-line operations: the asynchronous tasks for data migration will compete for system resources and therefore degrade the system throughput.

Figure 1:
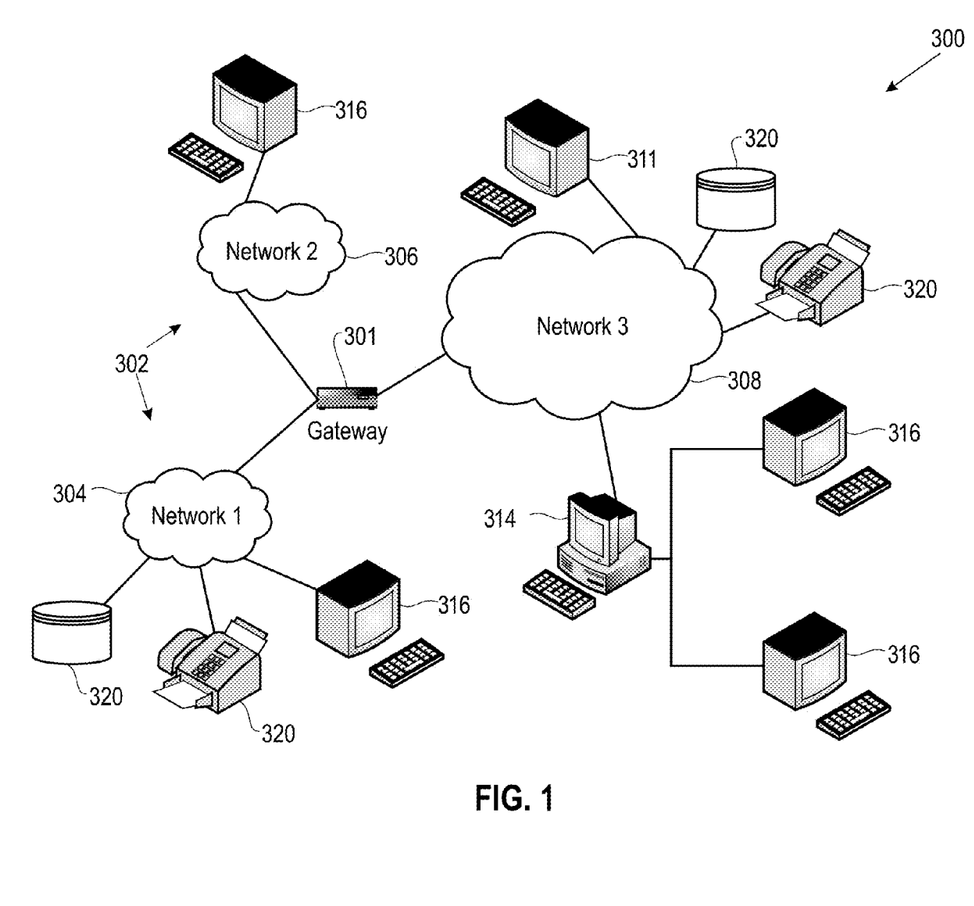
FIG. 1 is a network architecture for migration of large data from an on-line content management system to an archival management system, according to an embodiment of the present invention.

FIG. 1 illustrates a network architecture 300, in accordance with one embodiment. As shown in FIG. 1, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 2:
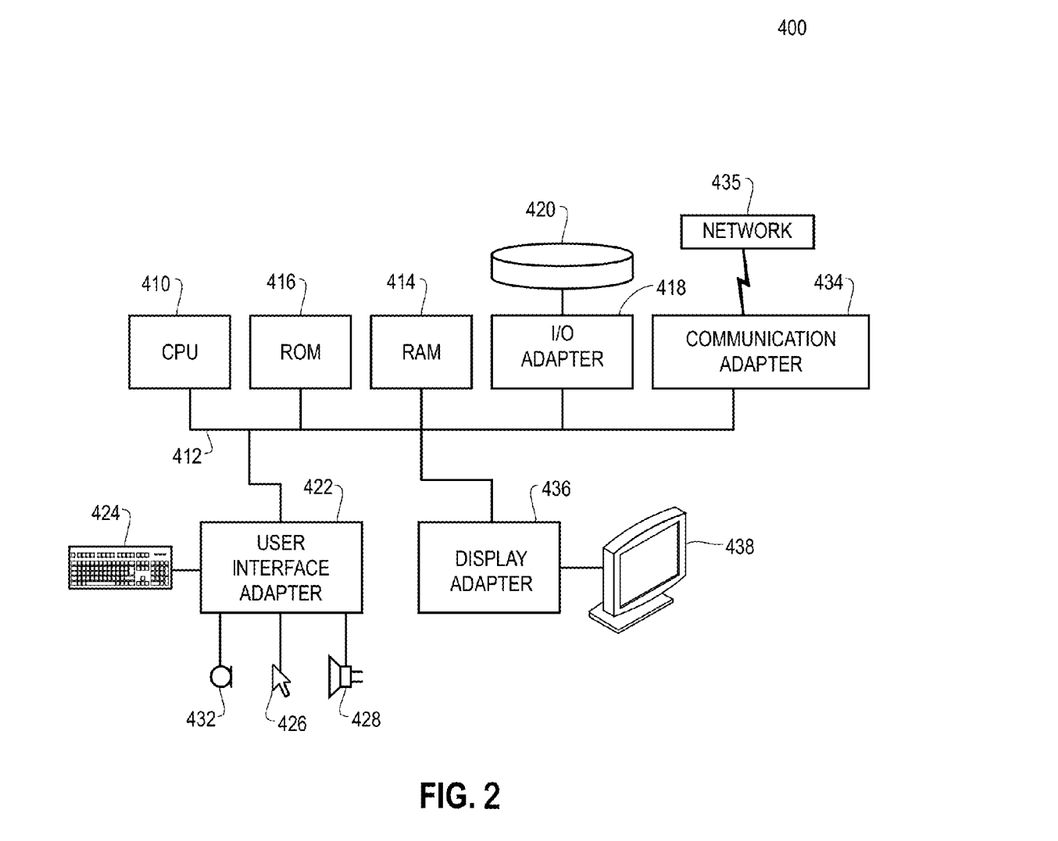
FIG. 2 shows a representative hardware environment that may be associated with the servers and/or clients of FIG. 1, according to an embodiment.

In one or more embodiments, the system 300 utilizes a process for providing a set of partitioning rules and policies are defined and managed across all of the relevant content management elements (metadata, content, relationships, etc.) such that bulk archival operations are enabled through the movement/propagation of those archived segments from the source system to the archival system. This implies the existence of two systems—a primary, source production system where content is originated and secondary, a target archival system where those partitioned segments are archived. Such a system would require that the database schemas from both systems remain consistent. A benefit of one or more embodiments is enabling bulk archival of content, its related metadata elements, and potentially other system characteristics, such as relationships, foldering, etc. The overhead of these bulk archival operations are significantly less than performing bulk migrations/copies of content items from one system to another FIG. 2 shows a representative hardware system 400 environment associated with a user device 316 and/or server 314 of FIG. 1, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
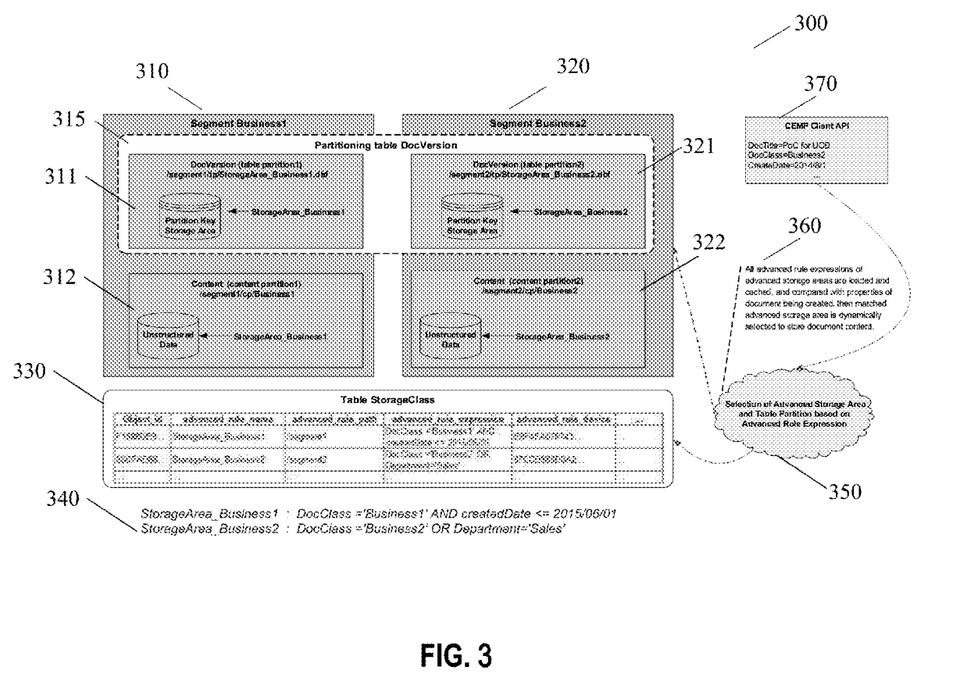
FIG. 3 shows an example of storage partitioning using a partition key field in a table, according to an embodiment.

FIG. 3 shows an example 300 of storage partitioning using a partition key field in a table StorageClass 330, according to an embodiment. For a content manager system, there are usually a core table representing a document (metadata), a table identifying where the document content is stored, and ancillary tables depicting documents relationships, foldering, etc. In one embodiment, a field is added into the core table and ancillary tables as a table partition key, and the partition field value is the storage symbolic name. When a document is being created with selected storage, the metadata will be placed into a corresponding partition in the core table, and other ancillary objects are placed into a corresponding partition in the ancillary tables. As a result, a set of content storage areas are mapped to a set of database partitions that contains all the business objects.

In one example using the IBM® FileNet Content Manager, the table DocVersion is used to represent document metadata, and the table StorageClass 330 identifies where the document content is stored. Existing property StorageArea is used as a DocVersion table partition key. In one example, during execution of a partitioning rule "StorageArea_Business1" creation, Advanced Rule Path "/segment1" 310 is specified, a new file system storage device "StorageArea_Business1" 312 will be created using that path to store document content, and a new partition "StorageArea_Business1" will be added into the partitioning table DocVersion 315 using new table space "StorageArea_Business1" 311 created meanwhile using the specified Advanced Rule Path. Advanced Rule Expression "DocClass='Business1' AND createdDate <=2015/06/01" will also be specified based on business rule requirement. Another partitioning rule "StorageArea_Busines2" 320 can be created using similar way, as shown below (with new table space "StorageArea_Business2" 321 created, and a new file system storage device "StorageArea_Business2" 322 created using the path to store document content). Then, the following set of partitioning rules 340 will be loaded and cached.
StorageArea_Business1: DocClass='Business1' AND createdDate <=2015/06/01
StorageArea_Business2: DocClass='Business2' OR Department='Sales'

In one example, when a document with the properties 370 (DocTitle=PoC for UOB, DocClass=Business2, and CreateDate=2014/8/1) is being created, at reference 360 the properties values will be compared with cached partitioning rules, the matched storage area "StorageArea_Business2" will be dynamically selected (reference 350), then document properties are stored into corresponding docVersion table 311 partition, while its content is stored into corresponding file system storage device.

In one embodiment, the details on how to implement an example against IBM® FileNet Content Manager is listed in table 1.

TABLE 1

| Property Name Descriptive Symbolic | Type | Read only/ Required [default] | Comments |
|---|---|---|---|
| Advanced Rule Path | String | RW/N | The path used to create docVersion table partition. |

TABLE 1-continued

| Property Name Descriptive Symbolic | Type | Read only/ Required [default] | Comments |
|---|---|---|---|
| Advanced Rule Name (Table Partition) | String | RW/N | This is the table partition name for this advanced storage area, a dedicated docVersion table partition will be created when an advanced storage area is being created. For example:<br>create table docVersion:<br>CREATE TABLE DocVersion(object_id raw(16) NOT<br>NULL PRIMARY KEY , storage_area_id varchar(16) ...)<br>PARTITION BY LIST(storage_area_id)(<br>PARTITION default values(xxxxx)<br>TABLESPACE<br>default<br>)<br>create new table space for the advanced storage area:<br>CREATE TABLESPACE<br><AdvancedRuleName> LOGGING<br>DATAFILE ' <AdvancedRulePath>/tp/<<br>AdvancedRuleName>.dbf' SIZE 50M<br>AUTOEXTEND ON NEXT 10M MAXSIZE<br>UNLIMITED EXTENT MANAGEMENT<br>LOCAL SEGMENT SPACE MANAGEMENT<br>AUTO;<br>add table partition:<br>ALTER TABLE DocVersion<br>ADD PARTITION <AdvancedRuleName><br>VALUES<br>(<AdvancedRuleName>) TABLESPACE < AdvancedRuleName> |
| Advanced Storage device connection (Content Partition) | Object | RW/N | This is the storage device connection used to store content associated with the docVersion table partition, its replica synchronization type is recommended to set Primary, either file system storage device or secured storage device can be created for it. For example:<br>create new file system storage device for the advanced storage area, and its root directory is:<br><AdvancedRulePath>/cp/<<br>AdvancedRuleName>/ |
| Advanced Rule Expression | String | RW/N | This is the criteria to select this advanced storage area for documents being created.<br>For example:<br>DocType ='Project' AND<br>DocumentTitle='DevOps' |

Figure 4:
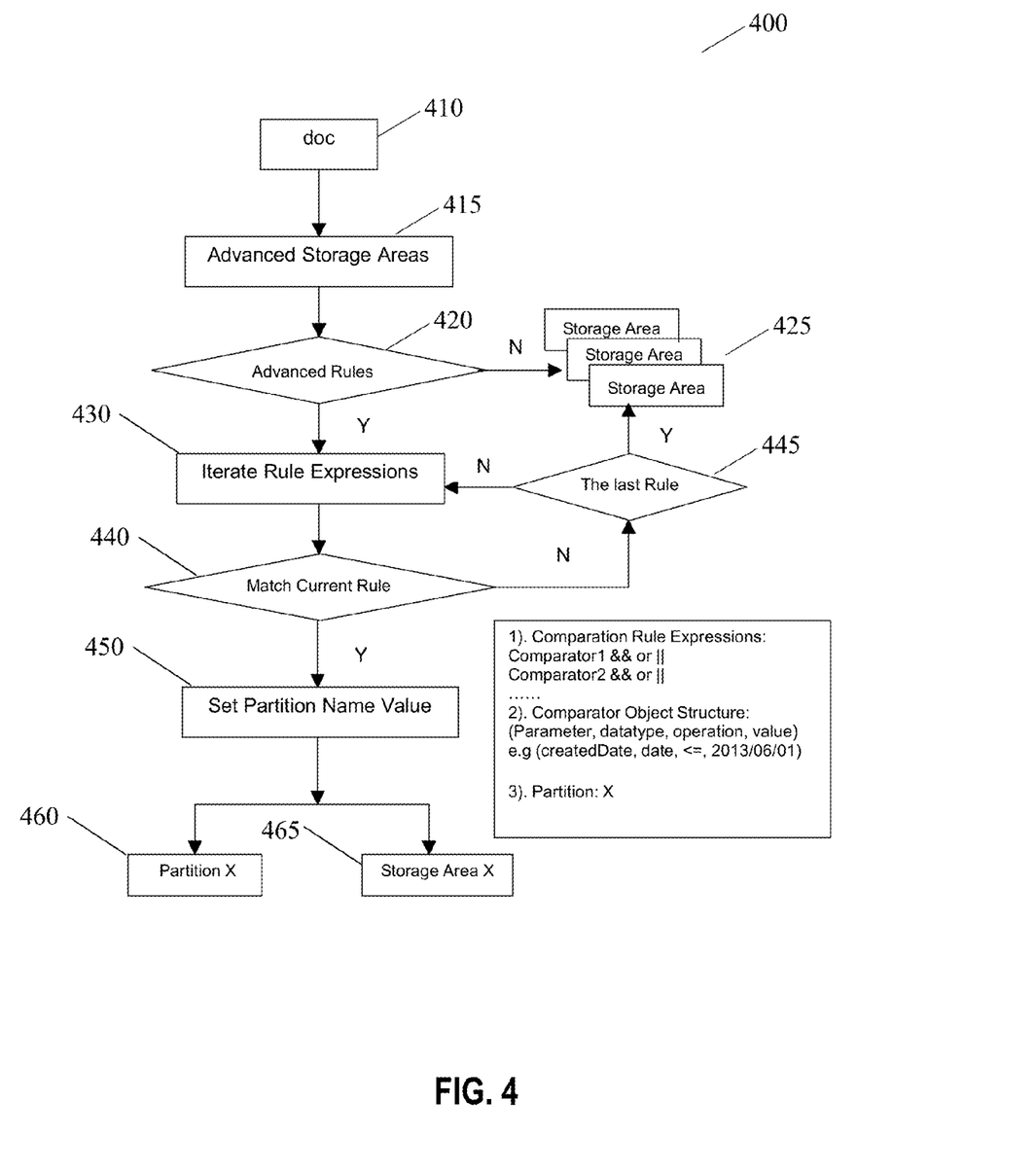
FIG. 4 shows an example flow for a process for selecting a storage area during document creation, according to an embodiment.

FIG. 4 shows an example flow 400 for a process for selecting a storage area during document creation, according to an embodiment. In one embodiment, in block 410 a document (doc) is created. In block 415, advanced storage areas are created. In block 420, advanced rules are checked for a match. If the advanced rules are found, the process proceeds to block 430, otherwise, the document is placed in storage areas 425. In block 430, rule expressions are iterated. In block 440, process 400 checks to determine whether a match is found for a current rule. If a match is not found, process 400 proceeds to block 445. Otherwise process 400 proceeds to block 450.

In block 445, process 400 determines whether the last rule has been checked. If the last rule has been checked, process 400 proceeds to store the document in the storage areas 425. Otherwise, process 400 proceeds to block 430. In block 450 the partition name value is set. In block 460, the partition X (e.g., the partition name value) is created. In block 465 the storage area X (e.g., the partition name value) is created.

Figure 5:
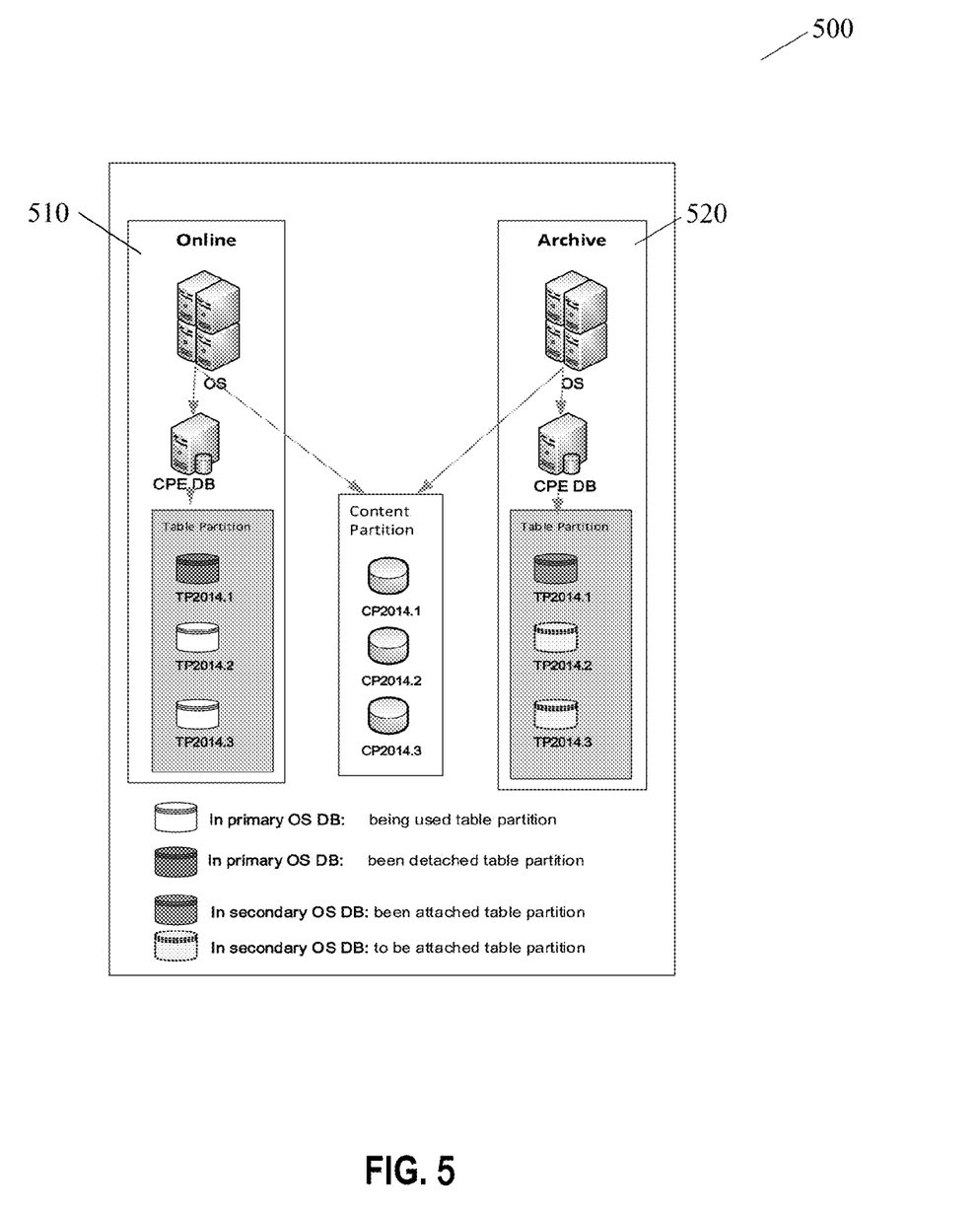
FIG. 5 shows an example of an enhanced advanced storage area for content partitioning with migration of large data from an on-line content management system to an archival management system, according to an embodiment.

FIG. 5 shows an example system 500 of an enhanced advanced storage area for content partitioning with migration of large data from an on-line content management (production) system 510 to an archival management system 520, according to an embodiment. In one example, the two systems (510/520) should run same the version of software to make sure the production database and the archival database have compatible schemas. In one embodiment, the advanced storage area (content partition) is closed before data migration (e.g., to prevent new partitions).

For ReferentialContainmentRelationship, after migration, folders should exist in both the on-line content management (production) system 510 and the archival management system 520. In one embodiment, entire folder tables Container and HierarchyIndex are copied from the source production system to the target archival system.

Object-value properties, and compound documents, will be broken if those related objects are not in a same table partition that is migrated. In one embodiment, a set of table partitions is created in corresponding tables, including table Relationship, Link, etc. There are cases that may not be solved with this example. For instance, filing documents from multiple partitions into the same folder. However, as long as those types of cases are avoided, the embodiment may be employed.

When the database and content partitions are migrated, the text index areas are still in the original repository. In one embodiment, a solution for this issue is to add an advanced Index Area to the Advanced Storage area, similar as how the Advanced Storage device connection is added.

Figure 6:
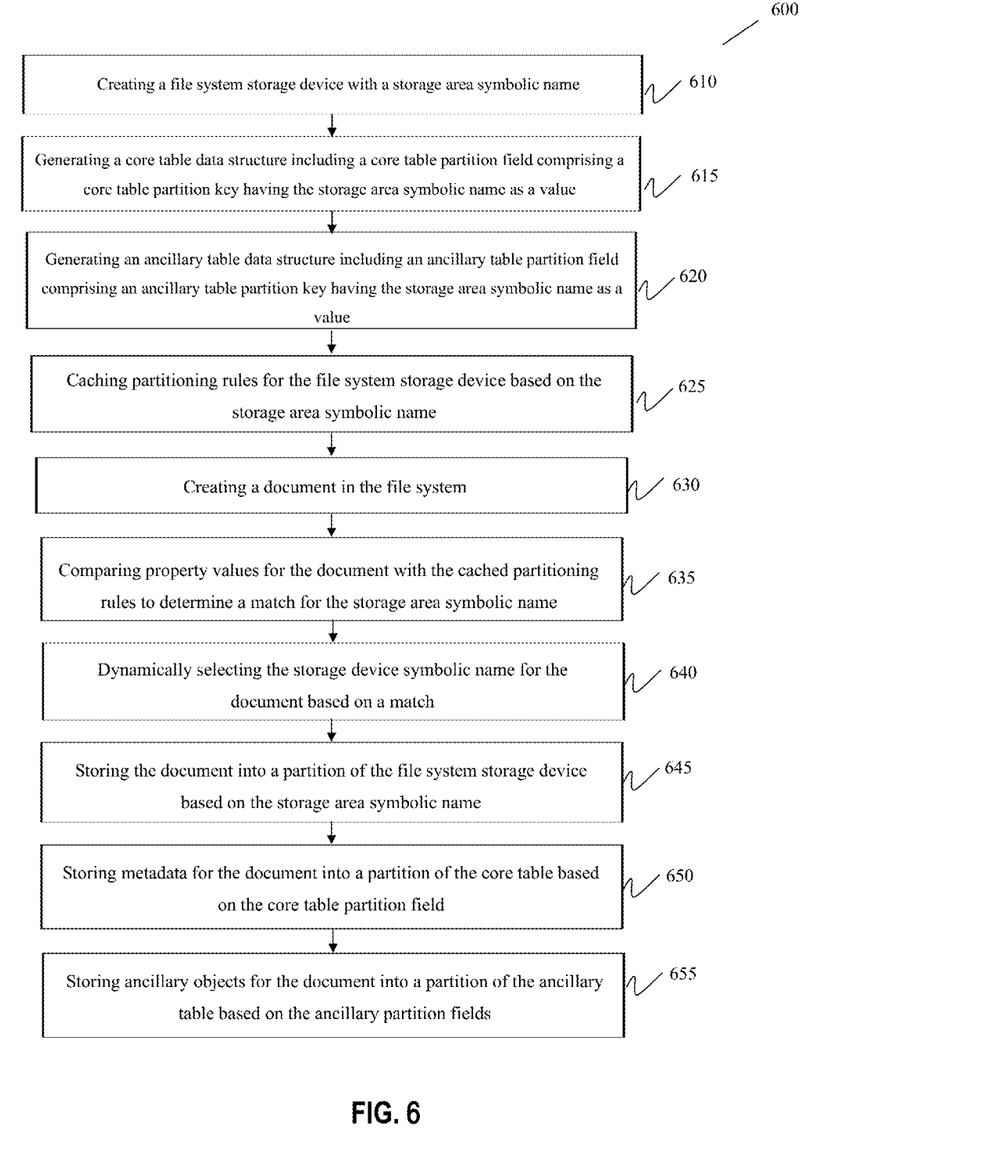
FIG. 6 illustrates a block diagram for a process for migration of large data from an on-line content management system to an archival management system, according to one embodiment.

FIG. 6 illustrates a block diagram for a process 600 for content management in a file system (e.g., network 300, system 400, system 500). In block 610 a file system storage device with a storage area symbolic name is created. In block 615 a core table data structure is generated including a core table partition field including a core table partition key having the storage area symbolic name as a value. In block 620 an ancillary table data structure is generated including an ancillary table partition field including an ancillary table partition key having the storage area symbolic name as a value. In block 625 partitioning rules for the file system storage device are cached based on the storage area symbolic name. In block 630 a document is created in the file system. In block 635 property values for the document are compared with the cached partitioning rules to determine a match for the storage area symbolic name. In block 640 process 600 provides dynamically selecting the storage device symbolic name for the document based on a match. In block 645 the document is stored into a partition of the file system storage device based on the storage area symbolic name. In block 650 metadata for the document is stored into a partition of the core table based on the core table partition field. In block 655 ancillary objects for the document are stored into a partition of the ancillary table based on the ancillary partition fields. In process 600, table partition migration is based on the partition of the core table and the partition of the ancillary table, and content partition migration is based on the partition of the file system storage device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for content management in a file system comprising;
   creating a file system storage device with a storage area symbolic name;
   generating a core table data structure including a core table partition field added as a core table partition key with the storage area symbolic name as a value for the core table partition field;
   generating an ancillary table data structure including an ancillary table partition field added as an ancillary table partition key with the storage area symbolic name as a value for the ancillary table partition field;
   caching partitioning rule paths for the file system storage device based on the storage area symbolic name;
   creating a document in the file system;
   comparing property values for the document with the cached partitioning rule paths to determine a match for the storage area symbolic name;
   dynamically selecting the storage device symbolic name for the document based on a match;
   storing the document into a partition of the file system storage device based on the storage area symbolic name;
   storing metadata for the document into a partition of the core table based on the core table partition field value; and
   storing ancillary objects for the document into a partition of the ancillary table based on the ancillary partition field value,
   wherein table partition migration is based on the partition of the core table and the partition of the ancillary table, and content partition migration is based on the partition of the file system storage device.

* * * * *